US011877712B2

(12) United States Patent
Schmekel

(10) Patent No.: US 11,877,712 B2
(45) **Date of Patent: *Jan. 23, 2024**

(54) AUTOMATIC AND CURRENTLESS DIRT REMOVER

(71) Applicant: NO CRUMBS GMBH, Wangen im Allgäu (DE)

(72) Inventor: Susanne Schmekel, Wangen im Allgäu (DE)

(73) Assignee: NO CRUMBS GMBH

(*) Notice: Subject to any disclaimer, the term of this patent is extended or adjusted under 35 U.S.C. 154(b) by 0 days.

This patent is subject to a terminal disclaimer.

(21) Appl. No.: 17/867,413

(22) Filed: Jul. 18, 2022

(65) Prior Publication Data

US 2022/0346626 A1 Nov. 3, 2022

Related U.S. Application Data

(63) Continuation of application No. 16/771,495, filed as application No. PCT/EP2018/083812 on Dec. 6, 2018, now Pat. No. 11,432,703.

(30) Foreign Application Priority Data

Dec. 12, 2017 (DE) ........................ 10 2017 129 642

(51) Int. Cl.
*A47L 25/00* (2006.01)
*B08B 1/00* (2006.01)
*B08B 6/00* (2006.01)

(52) U.S. Cl.
CPC ............ *A47L 25/005* (2013.01); *B08B 1/001* (2013.01); *B08B 6/00* (2013.01)

(58) Field of Classification Search
CPC ......... B08B 1/001; B08B 6/00; A47L 25/005; D06F 58/22; D06F 58/24
USPC .......................................................... 15/1.51
See application file for complete search history.

(56) References Cited

U.S. PATENT DOCUMENTS

| | | | |
|---|---|---|---|
| 4,920,662 | A | 5/1990 | Seeburger |
| 6,174,577 | B1 | 1/2001 | Vitorino |
| 2006/0054187 | A1 | 3/2006 | Morse et al. |
| 2006/0288600 | A1 | 12/2006 | Taylor |
| 2007/0136973 | A1 | 6/2007 | Patel et al. |
| 2010/0306933 | A1 | 12/2010 | Ussen et al. |
| 2012/0304405 | A1 | 12/2012 | Knopow et al. |
| 2017/0055807 | A1 | 3/2017 | Rucki |
| 2019/0126326 | A1 | 5/2019 | Lyne et al. |

FOREIGN PATENT DOCUMENTS

| | | | |
|---|---|---|---|
| CN | 2726518 | Y | 9/2005 |
| CN | 201591535 | U | 9/2010 |
| CN | 202426488 | U | 9/2012 |

(Continued)

OTHER PUBLICATIONS

International Search Report issued in International Application No. PCT/EP2018/083812; dated Apr. 1, 2019; 2 pages.

*Primary Examiner* — Tom Rodgers
(74) *Attorney, Agent, or Firm* — Dilworth IP, LLC

(57) ABSTRACT

An automatic and currentless dirt remover for collecting dirt from the area surrounding the dirt remover, having a dirt-collecting body and a rolling-action sheath body, which defines a receiving space for receiving the dirt-collecting body. The sheath body has openings for providing external access to the dirt-collecting body, which has a surface that collects the dirt.

19 Claims, 1 Drawing Sheet

(56) References Cited

FOREIGN PATENT DOCUMENTS

| | | | |
|---|---|---|---|
| CN | 102860807 | A | 1/2013 |
| CN | 204744081 | U | 11/2015 |
| CN | 105212855 | A | 1/2016 |
| JP | 860132259 | U | 9/1985 |
| JP | 3004812 | U | 11/1994 |
| JP | H10262881 | A | 10/1998 |
| JP | H10265303 | A | 10/1998 |
| JP | 2002331190 | A | 11/2002 |
| JP | 2011050709 | A | 3/2011 |
| KR | 101586375 | B1 | 1/2016 |
| KR | 101964676 | B1 | 4/2019 |
| WO | 2005070273 | A1 | 8/2005 |

AUTOMATIC AND CURRENTLESS DIRT REMOVER

FIELD OF THE INVENTION

The invention relates to an automatic and currentless dirt remover for collecting dirt from the area surrounding the dirt remover.

BACKGROUND

Currentless dirt removers which remove dirt from surfaces, for example lint or fluff from textiles, are known from the state of the art. Such currentless dirt removers are also called lint rollers. Lint rollers have a handle, which can be gripped by a person in order to operate the lint roller. To collect the lint, the lint roller usually additionally has a cylinder which consists of a sticky material or is provided with an adhesive layer. Using the handle, the person guides the lint roller, in particular the sticky cylinder, over the surface to be cleaned, with the result that the dirt located on the surface adheres to the cylinder. To clean the lint roller, the collected dirt can afterwards be pulled off or removed from the surface of the cylinder.

As already explained, by moving the handle the user moves the lint rollers back and forth over the surface to be cleaned, with the result that active operation of the lint roller by the respective user is necessary in order to clean the surface.

In addition, the lint rollers known from the state of the art are only suitable for cleaning relatively large or easily accessible surface areas, as, because of their size, they cannot be used at points that are difficult to access or at narrow points, for example in a bag or a handbag.

SUMMARY

The object of the invention is to provide a currentless dirt remover which can collect dirt automatically, in particular even at points that are difficult to access.

The object is achieved according to the invention by an automatic and currentless dirt remover for collecting dirt from the area surrounding the dirt remover, with a dirt-collecting body and a rolling-action sheath body, which defines a receiving space in which the dirt-collecting body is received, wherein the sheath body has a lattice design and has openings in order to provide external access to the dirt-collecting body, which has a surface which collects the dirt.

The basic idea of the invention is that the dirt remover can move independently or automatically, as the sheath body, which represents the outer sheath of the dirt remover, has a rolling action. It is hereby guaranteed that the dirt remover can move, in particular can roll, correspondingly automatically over the sheath body. As the sheath body has several openings and the dirt-collecting body is arranged in the latticed sheath body, the dirt-collecting body can interact with the area surrounding the dirt remover via the openings in the sheath body, in order to collect the dirt present there. The dirt can be lint, dust, grit, tobacco, crumbs or the like.

In general, the automatic and currentless dirt remover is dimensioned such that it can be used, for example, in bags, handbags, camera bags, suitcases, rucksacks, washbags and/or satchels in order to clean them correspondingly, thus in a container generally. The automatic and currentless dirt remover can therefore be used in particular where a movement is initiated by the user of the dirt remover, for example by their own movement, which is transferred to the dirt remover via the corresponding bag, with the result that the dirt remover is propelled currentlessly.

In this respect, the object is also achieved according to the invention by the use of the automatic and currentless dirt remover in a container, for example in a bag, a handbag, a camera bag, a suitcase, a rucksack, a washbag and/or a satchel. A corresponding automatic and currentless cleaning is effected in the corresponding container through the use of the dirt remover, for example when the container is being carried.

One aspect provides that the surface of the dirt-collecting body is designed to attract dirt, in particular is statically charged and/or adherent, for example is provided with at least one adhesive layer. The dirt present on the surface to be cleaned can therefore be attracted to the dirt-collecting body, in particular its surface, wherein the dirt then adheres to the surface of the dirt-collecting body. This can be effected via a chemical or electromagnetic adhesion. Furthermore, the surface of the dirt-collecting body can be structured in order also to provide a mechanical adhesion.

The dirt-collecting body can be formed entirely of an adherent material. Alternatively the surface of the dirt-collecting body can have at least one adhesive layer, which is applied to an otherwise non-adherent core.

Further, several plies of adhesive layers can be provided, which are removable for example in each case individually, in particular when there is no longer any adhesive action of the outer adhesive layer.

The dirt-collecting action of the dirt remover can be restored easily by removing or pulling off the outer (used) adhesive layer, with the result that a new (unused) adhesive layer of the multi-ply structure represents the new outer adhesive layer.

A further aspect provides that the dirt-collecting body is received in the receiving space such that the dirt-collecting body can move relative to the latticed sheath body. In this respect, it is possible for a relative movement between the dirt-collecting body and the latticed sheath body surrounding the dirt-collecting body to be possible, with the result that the dirt-collecting body can carry out a movement of its own. Through the relative movement, the dirt-collecting body inside the sheath body can propel the dirt remover by transferring its momentum. Further, the entire surface of the dirt-collecting body can thus become active.

The dirt-collecting body, in particular its surface, can press onto the surface to be cleaned, thus through the openings in the latticed sheath body, due to the action of gravity. A better cleaning action can thereby be achieved.

According to an embodiment the dirt-collecting body is a sphere. The sheath body can likewise be a sphere. If both the dirt-collecting body and the sheath body are formed as a sphere, it is ensured that the dirt remover can move freely over the sheath body in all directions. Likewise, it is possible for the dirt-collecting body to be able to move freely inside the sheath body, with the result that a particularly good cleaning is possible, as there is a high degree of freedom with respect to the movement. The dirt remover can thus roll in all directions in order to collect the dirt from the surrounding area.

The dirt remover itself can therefore be formed as a sphere, with the result that the automatic and currentless dirt remover can also be called an automatic and currentless dirt sphere.

As an alternative to the spherical shape, both the dirt-collecting body and the sheath body can in each case be formed as a cylinder, in particular a circular cylinder. Via the lateral surface of the cylinders, it is likewise ensured that the dirt remover can roll over the sheath body. The dirt-collecting body received in the sheath body can move relative to the sheath body.

In this respect, the dirt remover itself can have a cylindrical shape overall. The dirt remover can hereby reach particularly well into corners, namely in the transition area from its cylindrical lateral surface to the base or top.

A further aspect provides that the inner surface of the sheath body provides a rolling contour for the dirt-collecting body, along which the dirt-collecting body rolls during the automatic dirt removal. If the sheath body and the dirt-collecting body are in each case formed as a sphere, a correspondingly high degree of freedom with respect to the rolling movement of the dirt-collecting body against the inner surface of the sheath body results. The rolling contour can also have a guide for the dirt-collecting body.

If the sheath body and the dirt-collecting body are in each case formed as a cylinder, at least one rolling contour along the inside of the lateral surface of the sheath body results. A corresponding relative movement is also possible via this.

In particular, the dirt-collecting body has at least one core, which has a higher density than the rest of the dirt-collecting body and/or of the sheath body. It is hereby possible for the dirt-collecting body to be formed heavier, whereby a self-movement of the dirt-collecting body is promoted. As soon as the dirt-collecting body is in motion, it can propel the latticed sheath body particularly well by moving over the rolling contour against the inner surface of the sheath body.

An embodiment provides that the latticed sheath body has a honeycomb structure, wherein the openings are honeycombed. There is hereby a particularly favourable relationship with respect to the cleaning surface formed by the openings and the stability of the sheath body, as the entire surface area of the openings (cleaning surface) is maximized in the case of a predefined stiffness of the sheath body. The cleanability of the dirt remover is accordingly maximized, wherein the stability of the dirt remover is not impaired, in particular that of the latticed sheath body which represents the outer sheath of the dirt remover.

According to a further aspect, the surface of the dirt-collecting body and/or the surface of the latticed sheath body are or is antibacterial. In addition to the cleaning of the area surrounding the dirt remover, a hygienic cleaning of the surrounding area is hereby carried out at the same time.

For example, the dirt-collecting body and/or the sheath body are or is formed from a plastic, a biodegradable plastic, a silicone, a polyamide, a rubber, a ceramic and/or a metal. These materials are particularly well-suited to the envisaged use of the dirt remover, as they can be provided cost-effectively on the one hand and are correspondingly durable on the other hand. In particular, the biodegradable plastic is suitable for a dirt remover which is formed as a (waste-neutral) disposable article.

Irrespective of the material used, the dirt remover can be a single-use article.

A further embodiment provides that the sheath body is formed in several parts, with the result that the sheath body can be opened, in particular wherein the at least two sheath body parts are connected to each other via at least one connecting means. Accordingly, the dirt remover is designed to be re-usable, as the sheath body can be opened in order to replace the dirt-collecting body if it is used up or if its dirt-collecting capacity is impaired. The connecting means can be a screw thread, a press fit, a groove and/or a protrusion, via which the at least two sheath body parts can be separated.

Alternatively, it can be provided that the sheath body is formed in one part, wherein it can still be opened because the sheath body has at least two sheath body sections that are displaceable relative to each other. The at least two sheath body sections can be coupled to each other via a hinge, wherein the hinge is formed in one part together with the sheath body sections. The hinge can be an integral hinge.

The automatic cleaning or the automatic dirt removing is guaranteed as the user need not operate the dirt remover manually in order to achieve the cleaning action or to collect the dirt.

BRIEF DESCRIPTION OF THE DRAWINGS

Further advantages and properties of the invention are revealed by the following description and the drawings, to which reference is made. In the drawings there are shown in.

DETAILED DESCRIPTION

Figure 1:
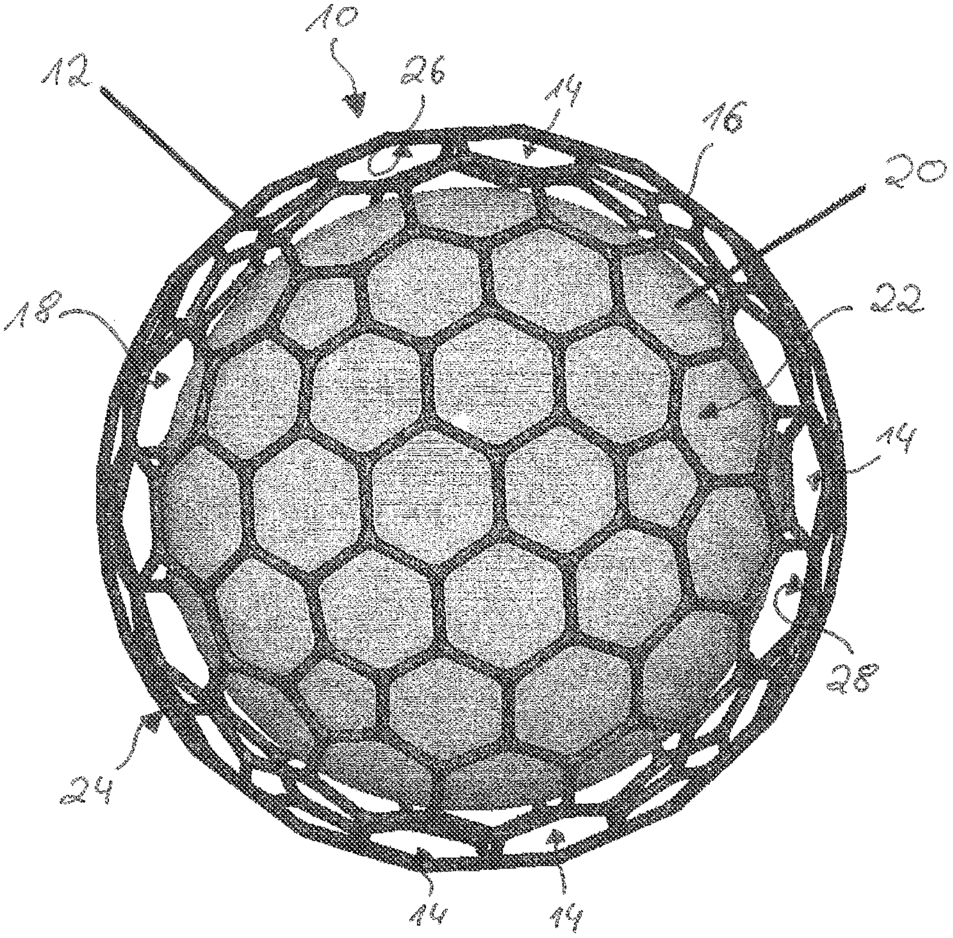
FIG. 1 a perspective view of a dirt remover according to the invention.

FIG. 1 shows an automatic and currentless dirt remover 10 which is provided for collecting dirt from the area surrounding the dirt remover 10.

The dirt remover 10 has a latticed sheath body 12, which is formed as a sphere. In this respect, the latticed sheath body 12 has a rolling action, as it can roll via its spherical outer surface. The sheath body 12 defines the external geometry of the dirt remover 10, with the result that the latter also has a spherical shape.

The latticed sheath body 12 has openings 14, which are formed honeycombed in the embodiment shown. In addition, the latticed sheath body 12 has a lattice 16, which forms the corresponding edges of the openings 14. The lattice 16 is therefore formed honeycombed. In general, the sheath body 12 therefore has a curved honeycomb structure because of its spherical shape.

The sheath body 12 defines a receiving space 18, which has the volume of a sphere. A dirt-collecting body 20, which is likewise formed as a sphere, is received in the receiving space 18. The sphere diameter of the dirt-collecting body 20 is smaller than the diameter of the spherical sheath body 12, with the result that the dirt-collecting body 20 can move freely inside the receiving space 18, thus relative to the sheath body 12.

The dirt-collecting body 20 has a surface 22, which is accessible externally via the openings 14. The surface 22 of the dirt-collecting body 20 is in general designed to attract dirt, with the result that dirt from the area surrounding the dirt remover 10 accumulates on the surface 22 of the dirt-collecting body 20.

The dirt-collecting action of the dirt-collecting body 20 can be achieved in that the surface 22 is adherent, thus is formed from an adherent material. For example, the surface 22 is provided with at least one adhesive layer, whereby the dirt-collecting body 20 is adhesive. In this respect, a chemical adhesion results. In general, several plies of adhesive layers can also be provided.

Alternatively, it can be provided that at least the surface 22 of the dirt-collecting body 20 is (electro)statically charged in order to obtain the dirt-attracting action. This corresponds to an electromagnetic adhesion.

The surface 22 can alternatively or additionally also be structured such that a mechanical adhesion results via the structuring.

In addition to the dirt-attracting action, the surface 22 of the dirt-collecting body 20 can additionally be antibacterial, with the result that the dirt-collecting body 20 has a hygienic action at the same time.

The surface 24 of the latticed sheath body 12 can likewise be formed antibacterial, as the surface 24 of the latticed sheath body 12 also comes into contact with the surrounding area, in order also to have an antibacterial action.

The dirt remover 10 can in general be used in places that are difficult to access, for example to clean bags, handbags, camera bags, suitcases, rucksacks, washbags and/or satchels.

For the cleaning, the fact that the movement of the user of the dirt remover 10 is transferred to the container in which the dirt remover 10 is provided for cleaning is utilized. Because of this transfer of movement, the rolling-action dirt remover 10 is likewise moved, with the result that it collects the dirt in the container automatically and currentlessly.

For this purpose, the spherical dirt remover 10 rolls via its spherical and latticed sheath body 12 along the surfaces to be cleaned of the container in which the dirt remover 10 is arranged. The surface 22 of the dirt-collecting body 20 comes into contact with the surfaces to be cleaned through the openings 14 of the sheath body 12, in order to collect the dirt present there. The dirt to be collected can be lint, dust, grit, tobacco, crumbs or the like. In every case, the dirt to be collected is attracted to the surface 22 of the dirt-collecting body 20 and adheres to the surface 22.

As the spherical dirt-collecting body 20 has a smaller diameter than the sheath body 12, it is additionally ensured that the dirt-collecting body 20 can roll on the inner surface 26 of the sheath body 12 during the movement of the dirt remover 10. In this respect, the inner surface 26 of the sheath body 12 forms a rolling contour 28 for the dirt-collecting body 20 during the automatic dirt removal, with the result that a relative movement between the sheath body 12 and the dirt-collecting body 20 is guaranteed.

Figure 2:
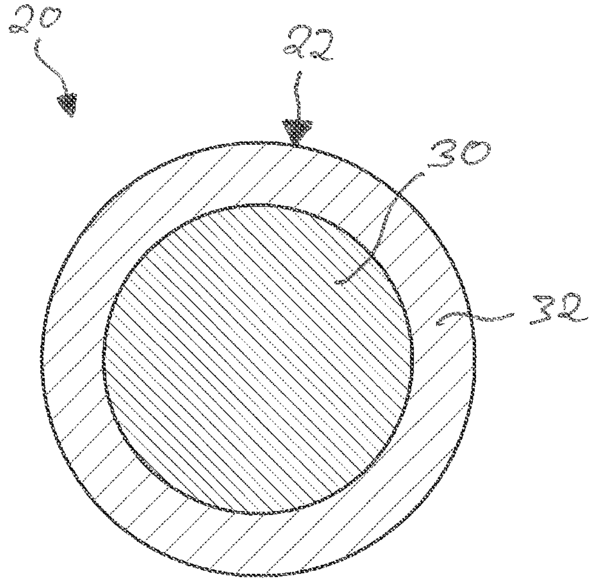
FIG. 2 a schematic sectional representation of a dirt-collecting body of a dirt remover according to the invention.

As FIG. 2, which shows a sectional representation of a dirt-collecting body 20 of a dirt remover 10 according to the invention, reveals, the dirt-collecting body 20 can have a core 30, which has a higher density than the rest 32 of the dirt-collecting body 20.

The dirt-collecting body 20, which is received in the sheath body 12, can hereby act as a mechanical drive for the dirt remover 10 because of its inert mass, if the spherical dirt-collecting body 20 has once been set in motion. The dirt-collecting body 20 then rolls along the rolling contour 28 formed by the inner surface 26 of the sheath body 12, in order to set the sheath body 12, and thus the entire dirt remover 10, in motion.

In general, the density of the dirt-collecting body 20, in particular of the core 30, can also be higher than the density of the sheath body 12.

The dirt-collecting body 20 and/or the sheath body 12 can be formed from a plastic, a biodegradable plastic, a silicone, a polyamide, a rubber, a ceramic and/or metal. These materials are particularly well-suited to the production of the dirt remover 10.

For example, the sheath body 12 can be produced around the dirt-collecting body 20 subsequently in a 3D printing process, with the result that the latter is received in the sheath body 12. The dirt-collecting body 20 can first be provided with a film or the like, which is pulled off after the sheath body 12 has been produced, in order to expose the dirt-attracting or sticky surface 22.

The dirt remover 10 can also have a (circular) cylindrically shaped sheath body 12 and a (circular) cylindrically shaped dirt-collecting body 20, with the result that they make a rolling movement possible in one dimension, namely along the lateral surface(s). Such a dirt remover 10 is therefore likewise formed substantially (circular) cylindrical. Such a dirt remover 10 is suitable in particular for cleaning corner areas.

The dirt remover 10 can have a sheath body 12 formed in several parts, which has two sheath body parts which are connected to each other via at least one connecting means.

The connecting means is, for example, a screw thread, which is designed in each case to correspond to the two sheath body parts.

Alternatively, a groove and a protrusion can be provided, which engage in each other in order to couple the two sheath body parts to each other. Further, the at least two sheath body parts can be coupled to each other via a press fit or a positive locking.

In general, it is hereby possible for the sheath body 12 to be able to be opened in order to change the dirt-attracting body 20 if the latter is used up or if its dirt-attracting action is no longer present as desired.

In general, the opening of the sheath body 12 can also be provided by a sheath body 12 formed in one piece, which has at least two sheath body sections which are coupled to each other via a coupling element, for example an (integral) hinge. The coupling element and the sheath body sections are coupled to each other in one piece. In addition, the sheath body sections can be coupled to each other via a press fit or a positive locking, via which the sheath body 12 can be opened correspondingly.

Besides the honeycomb shape shown in FIG. 1, the openings 14 of the latticed sheath body 12 can have other shapes, for example the openings 14 can be round, oval, triangular, square or polygonal.

An automatic and currentless dirt remover 10 is thus created which easily ensures that a container cleans itself automatically when carried, if the dirt remover 10 is provided in the container.

The use of the dirt remover 10 in a container therefore ensures the automatic and currentless cleaning of the container, wherein the container can be a bag, a handbag, a camera bag, a suitcase, a rucksack, a washbag and/or a satchel.

What is claimed is:

1. A method of collecting dirt from a container carried by a user by means of an automatic and currentless dirt remover, comprising steps of:

arranging the dirt remover in the container carried by the user, the dirt remover including a dirt-collecting body having a surface which is chemically adhesive and collects the dirt and a rolling-action sheath body which defines a receiving space in which the dirt-collecting body is received, the sheath body having openings in order to provide external access to the dirt-collecting body, wherein the dirt-collecting body contacts an inner surface of the sheath body, wherein the dirt-collecting body is not secured to the sheath body, and wherein the dirt remover is configured to roll via its sheath body along a surface to be cleaned in order to collect dirt present at the surface to be cleaned since the dirt collected adheres to the adhesive surface of the dirt-collecting body, initiating a movement of the dirt remover by a movement of the user, the movement being transferred to the dirt remover by the container resulting in the dirt remover being propelled currentlessly, and effecting an automatic and currentless cleaning in the container through the movement of the user of the dirt remover when the container is carried since the dirt remover rolls via the sheath body along the surface to be cleaned of the container in which the dirt remover is arranged such that the surface of the dirt-collecting body comes into contact with the surface to be cleaned through the openings of the sheath body in order to collect the dirt present there that adheres to the surface of the dirt-collecting body.

2. The method according to claim 1, characterized in that the container is a bag, handbag, camera bag, suitcase, rucksack, washbag, pocket or satchel.

3. The method according to claim 1, characterized in that the inner surface of the sheath body provides a rolling contour for the dirt-collecting body, along which the dirt-collecting body rolls during automatic dirt removal such that the dirt-collecting body contacts the inner surface of the sheath body.

4. The method according to claim 1, characterized in that the sheath body has at least two sheath body parts which are connected to each other via a press fit or a positive locking.

5. The method according to claim 1, characterized in that the surface of the dirt-collecting body is free of irregularities, thereby providing a smooth surface.

6. The method according to claim 1, characterized in that the dirt-collecting body contacts the surface to be cleaned during usage of the dirt remover.

7. The method according to claim 1, characterized in that the inner surface of the sheath body provides a rolling contour for the dirt-collecting body, along which the dirt-collecting body rolls during automatic dirt removal such that the dirt-collecting body contacts the inner surface of the sheath body, wherein the sheath body has at least two sheath body parts which are connected to each other via a press fit or a positive locking, wherein the dirt-collecting body contacts the surface to be cleaned during usage of the dirt remover, and wherein the surface of the dirt-collecting body is free of irregularities, thereby providing a smooth surface.

8. The method according to claim 1, characterized in that the dirt-collecting body is received in the receiving space such that the dirt-collecting body can move relative to the sheath body.

9. The method according to claim 1, characterized in that the dirt-collecting body has at least one core, which has a higher density than a rest of the dirt-collecting body and/or of the sheath body.

10. The method according to claim 1, characterized in that the dirt-collecting body and/or the sheath body are or is formed from a plastic, a biodegradable plastic, a silicone, a polyamide, a rubber, a ceramic and/or a metal.

11. A method of collecting dirt from a surface to be cleaned by means of an automatic and currentless dirt remover, comprising steps of:

placing the dirt remover on the surface to be cleaned, the dirt remover including a dirt-collecting body having a surface which is chemically adhesive and collects the dirt and a rolling-action sheath body which defines a receiving space in which the dirt-collecting body is received, the sheath body having openings in order to provide external access to the dirt-collecting body, wherein the dirt-collecting body contacts an inner surface of the sheath body, wherein the dirt-collecting body is not secured to the sheath body, and wherein the dirt remover is configured to roll via its sheath body along the surface to be cleaned in order to collect dirt present at the surface to be cleaned since the dirt collected adheres to the adhesive surface of the dirt-collecting body, initiating a movement of the dirt remover such that the dirt remover is propelled currentlessly, and effecting an automatic and currentless cleaning of the surface to be cleaned since the dirt remover rolls via the sheath body along the surface to be cleaned such that the surface of the dirt-collecting body comes into contact with the surface to be cleaned through the openings of the sheath body in order to collect the dirt present there that adheres to the surface of the dirt-collecting body, wherein the movement of the dirt remover is initiated by a movement of a user, wherein the automatic and currentless cleaning is effected through the movement of the user.

12. The method according to claim 11, characterized in that the inner surface of the sheath body provides a rolling contour for the dirt-collecting body, along which the dirt-collecting body rolls during automatic dirt removal such that the dirt-collecting body contacts the inner surface of the sheath body.

13. The method according to claim 11, characterized in that the sheath body has at least two sheath body parts which are connected to each other via a press fit or a positive locking.

14. The method according to claim 11, characterized in that the dirt-collecting body contacts the surface to be cleaned during usage of the dirt remover.

15. The method according to claim 11, characterized in that the surface of the dirt-collecting body is free of irregularities, thereby providing a smooth surface.

16. The method according to claim 11, characterized in that the inner surface of the sheath body provides a rolling contour for the dirt-collecting body, along which the dirt-collecting body rolls during automatic dirt removal such that the dirt-collecting body contacts the inner surface of the sheath body, wherein the sheath body has at least two sheath body parts which are connected to each other via a press fit or a positive locking, wherein the dirt-collecting body contacts the surface to be cleaned during usage of the dirt remover, and wherein the surface of the dirt-collecting body is free of irregularities, thereby providing a smooth surface.

17. An automatic and currentless dirt remover for collecting dirt from an area surrounding the dirt remover, the dirt remover comprising:

a dirt-collecting body having a surface which collects the dirt, wherein the dirt-collecting body is entirely formed from a single material with the surface of the dirt-collecting body being adherent and free of irregularities, thereby providing an one-pieced dirt-collecting body having a smooth surface, wherein the surface of the dirt-collecting body is chemically adhesive; and a rolling-action sheath body, which defines a receiving space in which the dirt-collecting body is received, the sheath body having openings in order to provide external access to the dirt-collecting body, wherein the dirt-collecting body contacts an inner surface of the sheath body, wherein the dirt-collecting body is not secured to the sheath body, and wherein the dirt remover is configured to roll via its sheath body along a surface to be cleaned in order to collect dirt present at the surface to be cleaned since the dirt collected adheres to the adhesive surface of the dirt-collecting body.

18. The dirt remover according to claim 17, characterized in that the surface of the dirt-collecting body is free of a separately formed adhesive layer provided on the dirt-collecting body.

19. The dirt remover according to claim 17, characterized in that the dirt-collecting body is made of a plastic, wherein the inner surface of the sheath body provides a rolling contour for the dirt-collecting body, along which the dirt-collecting body rolls during automatic dirt removal, and wherein the surface of the dirt-collecting body is free of an adhesive layer provided on the dirt-collecting body.

* * * * *